(12) United States Patent
Nakano et al.

(10) Patent No.: US 8,530,538 B2
(45) Date of Patent: *Sep. 10, 2013

(54) INK COMPOSITION

(75) Inventors: Keitaro Nakano, Matsumoto (JP); Takashi Oyanagi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 641 days.

This patent is subject to a terminal disclaimer.

(21) Appl. No.: 11/887,464

(22) PCT Filed: Mar. 29, 2006

(86) PCT No.: PCT/JP2006/306457
§ 371 (c)(1), (2), (4) Date: Aug. 26, 2009

(87) PCT Pub. No.: WO2006/104192
PCT Pub. Date: Oct. 5, 2006

(65) Prior Publication Data
US 2009/0318580 A1    Dec. 24, 2009

(30) Foreign Application Priority Data

Mar. 29, 2005   (JP) .................................. 2005-094829
Mar. 3, 2006    (JP) .................................. 2006-058694

(51) Int. Cl.
*C08J 3/28* (2006.01)
*G03G 9/097* (2006.01)
*B29C 71/04* (2006.01)
*C08F 290/14* (2006.01)
*B41M 7/00* (2006.01)
*B01F 3/04* (2006.01)
*C08G 65/18* (2006.01)
*C08F 20/22* (2006.01)

(52) U.S. Cl.
USPC ................. 522/148; 522/75; 522/83; 522/84; 522/85; 522/74; 522/173; 522/167; 522/182

(58) Field of Classification Search
USPC ................... 522/75, 83, 84, 85, 74, 148, 173, 522/167, 182
See application file for complete search history.

(56) References Cited

U.S. PATENT DOCUMENTS

| | | |
|---|---|---|
| 3,582,487 A | 6/1971 | Fuhr et al. |
| 3,607,693 A | 9/1971 | Heine et al. |
| 3,720,635 A | 3/1973 | Metzner et al. |
| 3,929,693 A | 12/1975 | Hochberg |
| 4,007,144 A | 2/1977 | Sanders et al. |
| 4,129,486 A | 12/1978 | Deutsch et al. |
| 4,133,793 A | 1/1979 | Lewis et al. |
| 4,190,602 A | 2/1980 | Brunisholz et al. |
| 4,233,195 A | 11/1980 | Mills |
| 4,239,866 A | 12/1980 | Reitel et al. |
| 4,239,966 A | 12/1980 | Wang |
| 4,308,400 A | 12/1981 | Felder et al. |
| 4,315,807 A | 2/1982 | Felder et al. |
| 4,318,791 A | 3/1982 | Felder et al. |
| 4,320,186 A | 3/1982 | Kato et al. |
| 4,321,118 A | 3/1982 | Felder et al. |
| 4,347,111 A | 8/1982 | Gehlhaus et al. |
| 4,370,379 A | 1/1983 | Kato et al. |
| 4,450,279 A | 5/1984 | Shirosaki et al. |
| 4,477,681 A | 10/1984 | Gehlhaus et al. |
| 4,507,466 A | 3/1985 | Tomalia et al. |
| 4,522,693 A | 6/1985 | Henne et al. |
| 4,558,120 A | 12/1985 | Tomalia et al. |
| 4,568,737 A | 2/1986 | Tomalia et al. |
| 4,587,329 A | 5/1986 | Tomalia et al. |
| 4,631,337 A | 12/1986 | Tomalia et al. |
| 4,694,064 A | 9/1987 | Tomalia et al. |
| 4,721,734 A | 1/1988 | Gehlhaus et al. |
| 4,830,902 A | 5/1989 | Plantenga et al. |
| 4,922,004 A | 5/1990 | Kohler et al. |
| 5,041,516 A | 8/1991 | Frechet et al. |
| 5,077,402 A | 12/1991 | Desobry et al. |
| 5,212,212 A | 5/1993 | Fonda |
| 5,221,334 A | 6/1993 | Ma et al. |
| 5,453,121 A | 9/1995 | Nicholls et al. |
| 5,609,671 A | 3/1997 | Nagasawa |
| 5,623,001 A | 4/1997 | Figov |
| 5,662,736 A | 9/1997 | Sakai et al. |
| 5,662,738 A | 9/1997 | Schmid et al. |
| 5,690,723 A | 11/1997 | Sano et al. |
| 5,846,306 A | 12/1998 | Kubota et al. |
| 5,903,290 A | 5/1999 | Nicoloff, Jr. et al. |
| 5,928,419 A | 7/1999 | Uemura et al. |
| 5,952,401 A * | 9/1999 | Kimura et al. ................ 523/161 |
| 5,958,121 A | 9/1999 | Lin |
| 5,976,233 A | 11/1999 | Osumi et al. |
| 6,030,441 A | 2/2000 | Kubota et al. |

(Continued)

FOREIGN PATENT DOCUMENTS

| | | |
|---|---|---|
| CN | 1086637 | 6/2002 |
| CN | 1398724 A | 2/2003 |

(Continued)

OTHER PUBLICATIONS

Patent Abstract of JP 2003-055463.

(Continued)

*Primary Examiner* — Ling Choi
*Assistant Examiner* — Jessica E Whiteley

(57) ABSTRACT

An ultraviolet hardenable ink composition excelling in the wetting characteristic (repellence prevention) of ink having impacted a recording medium. There is provided an ultraviolet hardenable ink composition characterized by containing a polyester-modified polydimethylsiloxane as a surfactant in an amount of 0.01 to 1% based on the ultraviolet hardenable ink. Preferably, at least allyl glycol and/or a N-vinyl compound is contained as a polymerizable compound. Incorporation of the polyester-modified polydimethylsiloxane in the surfactant has realized enhancing of the wetting characteristic on all nonabsorptive material surfaces and avoiding of ink repellence.

13 Claims, No Drawings

(56) References Cited

U.S. PATENT DOCUMENTS

| | | | |
|---|---|---|---|
| 6,087,416 A | 7/2000 | Pearlstine et al. | |
| 6,114,404 A | 9/2000 | Deeken et al. | |
| 6,117,606 A | 9/2000 | Macholdt et al. | |
| 6,123,759 A | 9/2000 | Mise et al. | |
| 6,136,286 A | 10/2000 | Okuyama et al. | |
| 6,179,415 B1 | 1/2001 | Okazaki et al. | |
| 6,187,897 B1 | 2/2001 | Kawashima et al. | |
| 6,300,388 B1 | 10/2001 | Verdonck et al. | |
| 6,322,188 B1 | 11/2001 | Sano | |
| 6,331,111 B1 | 12/2001 | Cao | |
| 6,332,291 B1 | 12/2001 | Flosbach et al. | |
| 6,341,841 B1 | 1/2002 | Shimada et al. | |
| 6,395,079 B1 | 5/2002 | Sano | |
| 6,419,733 B1 | 7/2002 | Sano et al. | |
| 6,428,862 B1 * | 8/2002 | Noguchi | 427/511 |
| 6,433,038 B1 | 8/2002 | Tanabe et al. | |
| 6,444,019 B1 | 9/2002 | Zou et al. | |
| 6,488,751 B1 | 12/2002 | Takemoto | |
| 6,491,748 B2 | 12/2002 | Watanabe | |
| 6,518,370 B2 | 2/2003 | Abuelyaman et al. | |
| 6,558,460 B1 | 5/2003 | Walker et al. | |
| 6,558,753 B1 * | 5/2003 | Ylitalo et al. | 427/466 |
| 6,602,333 B2 | 8/2003 | Miyabayashi | |
| 6,637,850 B2 | 10/2003 | Shimada et al. | |
| 6,653,367 B2 | 11/2003 | Miyabayashi | |
| 6,654,367 B1 | 11/2003 | Kaufman | |
| 6,664,306 B2 | 12/2003 | Gaddam et al. | |
| 6,726,756 B1 * | 4/2004 | Zou et al. | 106/31.57 |
| 6,793,313 B1 | 9/2004 | Adachi et al. | |
| 6,793,318 B2 | 9/2004 | Saksa | |
| 6,846,074 B2 | 1/2005 | Hirai | |
| 6,846,851 B2 | 1/2005 | Nakhmanovich et al. | |
| 6,849,110 B2 | 2/2005 | Sano | |
| 6,869,470 B2 | 3/2005 | Kato | |
| 6,877,851 B2 * | 4/2005 | Watanabe | 347/100 |
| 6,890,049 B2 | 5/2005 | Shimada et al. | |
| 6,924,327 B2 | 8/2005 | Sano et al. | |
| 6,989,054 B2 | 1/2006 | Tanabe et al. | |
| 7,008,475 B2 | 3/2006 | Randler et al. | |
| 7,025,449 B2 | 4/2006 | Simons et al. | |
| 7,040,747 B2 | 5/2006 | Kubota et al. | |
| 7,064,153 B2 | 6/2006 | Bruck | |
| 7,156,909 B2 | 1/2007 | Oyanagi et al. | |
| 7,259,100 B2 | 8/2007 | Zurcher et al. | |
| 7,285,592 B2 | 10/2007 | Harz et al. | |
| 7,296,883 B2 | 11/2007 | Kanaya et al. | |
| 7,303,619 B2 | 12/2007 | Oyanagi | |
| 7,348,128 B2 | 3/2008 | Yamada et al. | |
| 7,384,472 B2 | 6/2008 | Schweikart et al. | |
| 7,419,255 B2 | 9/2008 | Kawaguchi et al. | |
| 7,438,405 B2 | 10/2008 | Ichizawa et al. | |
| 7,513,945 B2 * | 4/2009 | Nakano et al. | 106/31.6 |
| 7,538,144 B2 | 5/2009 | Vanmaele et al. | |
| 7,581,829 B2 * | 9/2009 | Oyanagi et al. | 347/100 |
| 7,591,889 B2 | 9/2009 | Stoffel et al. | |
| 7,604,693 B2 | 10/2009 | Oyanagi et al. | |
| 7,619,015 B2 | 11/2009 | Oyanagi et al. | |
| 7,670,418 B2 | 3/2010 | Kato et al. | |
| 7,732,505 B2 | 6/2010 | Kito et al. | |
| 7,753,514 B2 * | 7/2010 | Nakano et al. | 347/100 |
| 7,790,245 B2 * | 9/2010 | Oyanagi et al. | 427/511 |
| 7,828,888 B2 | 11/2010 | Itano et al. | |
| 7,846,246 B2 | 12/2010 | Oyanagi et al. | |
| 7,850,280 B2 * | 12/2010 | Oyanagi et al. | 347/51 |
| 7,854,798 B2 | 12/2010 | Udagawa et al. | |
| 7,855,041 B2 | 12/2010 | Weber et al. | |
| 7,866,807 B2 | 1/2011 | Makuta et al. | |
| 7,968,621 B2 * | 6/2011 | Oyanagi et al. | 523/160 |
| 8,044,116 B2 | 10/2011 | Idemura et al. | |
| 2003/0017353 A1 | 1/2003 | Yamaguchi et al. | |
| 2003/0050379 A1 | 3/2003 | Shih et al. | |
| 2003/0089271 A1 | 5/2003 | Hirano et al. | |
| 2003/0144377 A1 | 7/2003 | Sano et al. | |
| 2003/0153649 A1 | 8/2003 | Bromberg | |
| 2003/0157356 A1 | 8/2003 | Tamura et al. | |
| 2003/0176566 A1 | 9/2003 | Wight et al. | |
| 2003/0222959 A1 | 12/2003 | Yamanouchi et al. | |
| 2003/0231234 A1 | 12/2003 | Ushirogouchi et al. | |
| 2004/0021753 A1 | 2/2004 | Yoshihiro et al. | |
| 2004/0069183 A1 | 4/2004 | Kamoto et al. | |
| 2004/0257419 A1 | 12/2004 | Iinuma et al. | |
| 2004/0266907 A1 | 12/2004 | Sugita et al. | |
| 2005/0039631 A1 | 2/2005 | Best et al. | |
| 2005/0159501 A1 | 7/2005 | Kiefer-Liptak | |
| 2005/0176841 A1 | 8/2005 | Krohn | |
| 2005/0176847 A1 | 8/2005 | Cagle | |
| 2005/0197418 A1 | 9/2005 | Graziano et al. | |
| 2005/0197419 A1 | 9/2005 | Graziano et al. | |
| 2005/0282930 A1 | 12/2005 | Fu et al. | |
| 2006/0009546 A1 | 1/2006 | Brown | |
| 2006/0014849 A1 | 1/2006 | Vanmaele et al. | |
| 2006/0014850 A1 | 1/2006 | Vanmaele et al. | |
| 2006/0036001 A1 | 2/2006 | Oyanagi et al. | |
| 2006/0092254 A1 | 5/2006 | Claes et al. | |
| 2006/0158493 A1 | 7/2006 | Nakano et al. | |
| 2006/0160917 A1 * | 7/2006 | Oyanagi et al. | 522/7 |
| 2006/0189712 A1 | 8/2006 | Kondo | |
| 2006/0211788 A1 | 9/2006 | Krohn | |
| 2006/0229382 A1 | 10/2006 | Schweikart et al. | |
| 2006/0268084 A1 | 11/2006 | Nishizaki et al. | |
| 2007/0022547 A1 | 2/2007 | O'Brien | |
| 2007/0037961 A1 | 2/2007 | Oyanagi et al. | |
| 2007/0044684 A1 | 3/2007 | Nakano et al. | |
| 2007/0046720 A1 | 3/2007 | Konno et al. | |
| 2007/0060670 A1 | 3/2007 | Ellis | |
| 2007/0076069 A1 | 4/2007 | Edwards et al. | |
| 2007/0120926 A1 | 5/2007 | Doumaux et al. | |
| 2007/0129457 A1 * | 6/2007 | Nakano et al. | 522/1 |
| 2007/0142520 A1 | 6/2007 | Oyanagi et al. | |
| 2007/0148585 A1 | 6/2007 | Kaneko et al. | |
| 2007/0222811 A1 | 9/2007 | Yanagi | |
| 2007/0224345 A1 | 9/2007 | Metz et al. | |
| 2007/0249750 A1 | 10/2007 | Oyanagi et al. | |
| 2007/0281141 A1 | 12/2007 | Kohlweyer | |
| 2008/0022893 A1 | 1/2008 | Mizutani | |
| 2008/0024577 A1 | 1/2008 | Nakano et al. | |
| 2008/0028980 A1 | 2/2008 | Aoki et al. | |
| 2008/0081119 A1 | 4/2008 | Oyanagi et al. | |
| 2008/0090931 A1 | 4/2008 | Nagvekar et al. | |
| 2008/0096998 A1 | 4/2008 | Oyanagi et al. | |
| 2008/0098928 A1 | 5/2008 | Oyanagi et al. | |
| 2008/0125511 A1 * | 5/2008 | Nakano et al. | 522/181 |
| 2008/0132599 A1 | 6/2008 | Nakano et al. | 522/161 |
| 2008/0145628 A1 | 6/2008 | Oyanagi et al. | |
| 2008/0146689 A1 * | 6/2008 | Oyanagi et al. | 522/39 |
| 2008/0152825 A1 | 6/2008 | Mukai et al. | |
| 2008/0152828 A1 | 6/2008 | Mukai et al. | |
| 2008/0152877 A1 | 6/2008 | Mukai et al. | |
| 2008/0173214 A1 | 7/2008 | Oyanagi et al. | |
| 2008/0182083 A1 | 7/2008 | Oyanagi et al. | |
| 2008/0182085 A1 | 7/2008 | Oyanagi et al. | |
| 2008/0207805 A1 | 8/2008 | Blease et al. | |
| 2008/0213518 A1 | 9/2008 | Oyanagi et al. | |
| 2008/0233362 A1 | 9/2008 | Kato et al. | |
| 2008/0250970 A1 | 10/2008 | Oyanagi et al. | |
| 2008/0308004 A1 | 12/2008 | Deroover et al. | |
| 2009/0053415 A1 | 2/2009 | Isobe | |
| 2009/0075036 A1 | 3/2009 | Itano et al. | |
| 2009/0099277 A1 | 4/2009 | Nagvekar et al. | |
| 2009/0110827 A1 | 4/2009 | Nakano et al. | |
| 2009/0142555 A1 | 6/2009 | Sano et al. | |
| 2009/0169834 A1 | 7/2009 | Sano et al. | |
| 2009/0208651 A1 | 8/2009 | Oyanagi et al. | |
| 2009/0214833 A1 | 8/2009 | Oyanagi et al. | |
| 2009/0220695 A1 | 9/2009 | Oyanagi et al. | |
| 2009/0233064 A1 | 9/2009 | Yatake et al. | |
| 2009/0246479 A1 | 10/2009 | Mukai et al. | |
| 2009/0289973 A1 | 11/2009 | Makuta et al. | |
| 2009/0295847 A1 | 12/2009 | Mukai et al. | |
| 2010/0009136 A1 | 1/2010 | Oyanagi et al. | |
| 2010/0086690 A1 | 4/2010 | Aoki | |
| 2010/0086691 A1 | 4/2010 | Mukai et al. | |
| 2010/0092674 A1 | 4/2010 | Mukai et al. | |
| 2010/0092675 A1 | 4/2010 | Aoki | |

| | | | |
|---|---|---|---|
| 2011/0014440 A1 | 1/2011 | Itano et al. | |
| 2011/0036266 A1 | 2/2011 | Oyanagi et al. | |
| 2011/0183124 A1 | 7/2011 | Aoki et al. | |
| 2011/0183125 A1 | 7/2011 | Aoki et al. | |
| 2012/0006224 A1 | 1/2012 | Oyanagi et al. | |

FOREIGN PATENT DOCUMENTS

| | | | |
|---|---|---|---|
| CN | 1529740 A | 9/2004 | |
| CN | 1721462 A | 1/2006 | |
| CN | 1771307 A | 5/2006 | |
| DE | 10 2005 021 160 A1 | 11/2006 | |
| EP | 0 284 561 A2 | 9/1988 | |
| EP | 0 333 224 A2 | 9/1989 | |
| EP | 0 352 821 A1 | 1/1990 | |
| EP | 0 372 778 A1 | 6/1990 | |
| EP | 0 894 835 A2 | 2/1999 | |
| EP | 0 997 507 A1 | 5/2000 | |
| EP | 1 045 013 A1 | 10/2000 | |
| EP | 1 260 563 A1 | 11/2002 | |
| EP | 1 295 916 A1 | 3/2003 | |
| EP | 1 422 072 A1 | 5/2004 | |
| EP | 1 452 569 A1 | 9/2004 | |
| EP | 1 614 730 A1 | 1/2006 | |
| EP | 1 616 920 A1 | 1/2006 | |
| EP | 1 616 921 A1 | 1/2006 | |
| EP | 1 674 499 A1 | 6/2006 | |
| EP | 1 752 504 A1 | 2/2007 | |
| EP | 1 806 387 A1 | 7/2007 | |
| EP | 1 815 978 A1 | 8/2007 | |
| EP | 1 837 381 A1 | 9/2007 | |
| EP | 1 862 511 A1 | 12/2007 | |
| EP | 1 892 105 A1 | 2/2008 | |
| EP | 1 942 157 A2 | 7/2008 | |
| EP | 1 942 158 A2 | 7/2008 | |
| EP | 1 947 151 A1 | 7/2008 | |
| EP | 1 950 260 A1 | 7/2008 | |
| GB | 1 276 369 | 6/1972 | |
| GB | 1 547 283 | 6/1979 | |
| GB | 2029433 A | 3/1980 | |
| GB | 2 172 655 A | 9/1986 | |
| GB | 2 367 299 A | 4/2002 | |
| JP | 47-3981 B | 2/1972 | |
| JP | 47-6416 B | 2/1972 | |
| JP | 47-22326 | 6/1972 | |
| JP | 47-23664 B | 7/1972 | |
| JP | 56-028256 A | 3/1981 | |
| JP | 57-30704 A | 2/1982 | |
| JP | 59-42864 B | 10/1984 | |
| JP | 60-26403 B2 | 6/1985 | |
| JP | 60-26483 B2 | 6/1985 | |
| JP | 61-194062 A | 8/1986 | |
| JP | 62-1426 A | 1/1987 | |
| JP | 62-81345 A | 4/1987 | |
| JP | 63-61950 B2 | 11/1988 | |
| JP | 01-34242 B2 | 7/1989 | |
| JP | 01-238656 | 9/1989 | |
| JP | 02-009596 B2 | 3/1990 | |
| JP | 02-009597 B2 | 3/1990 | |
| JP | 2-211452 A | 8/1990 | |
| JP | 3-56573 A | 3/1991 | |
| JP | 3-79678 A | 4/1991 | |
| JP | 3-160068 A | 7/1991 | |
| JP | 4-18462 A | 1/1992 | |
| JP | 05-186725 A | 7/1993 | |
| JP | 07-258578 A | 10/1995 | |
| JP | 08-003498 A | 1/1996 | |
| JP | 08-218018 A | 8/1996 | |
| JP | 08-283596 A | 10/1996 | |
| JP | 08-295836 A | 11/1996 | |
| JP | 10-110110 A | 4/1998 | |
| JP | 10-110111 A | 4/1998 | |
| JP | 10-110114 A | 4/1998 | |
| JP | 10-120956 A | 5/1998 | |
| JP | 10-120958 A | 5/1998 | |
| JP | 10-195331 A | 7/1998 | |
| JP | 10-195360 A | 7/1998 | |
| JP | 10-237349 A | 9/1998 | |
| JP | 10-287035 A | 10/1998 | |
| JP | 10-330665 A | 12/1998 | |
| JP | 11-011002 A | 1/1999 | |
| JP | 11-165420 A | 6/1999 | |
| JP | 11-193316 A | 7/1999 | |
| JP | 11-202558 A | 7/1999 | |
| JP | 11-343436 A | 12/1999 | |
| JP | 2000-044858 A | 2/2000 | |
| JP | 2000-044861 A | 2/2000 | |
| JP | 2000-336295 A | 12/2000 | |
| JP | 2000-345080 A | 12/2000 | |
| JP | 2000-355667 A | 12/2000 | |
| JP | 2001-348519 A | 12/2001 | |
| JP | 2002-038063 A | 2/2002 | |
| JP | 2007-045990 A | 2/2002 | |
| JP | 2002-179960 A | 6/2002 | |
| JP | 2002-225414 A | 8/2002 | |
| JP | 2002-249165 A | 9/2002 | |
| JP | 2002-256189 A | 9/2002 | |
| JP | 2002-529572 | 9/2002 | |
| JP | 2002-292775 A | 10/2002 | |
| JP | 2002-332436 A | 11/2002 | |
| JP | 2002-348513 A | 12/2002 | |
| JP | 2003-012971 A | 1/2003 | |
| JP | 2003-55463 | 2/2003 | |
| JP | 2003-55563 | 2/2003 | |
| JP | 2003-096337 A | 4/2003 | |
| JP | 2003-253148 A | 9/2003 | |
| JP | 2003-292836 A | 10/2003 | |
| JP | 2003-292857 | 10/2003 | |
| JP | 2003-292857 A | 10/2003 | |
| JP | 2003-306625 A | 10/2003 | |
| JP | 2003-311945 A | 11/2003 | |
| JP | 2003-342499 A | 12/2003 | |
| JP | 2004-009359 A | 1/2004 | |
| JP | 2004-009360 A | 1/2004 | |
| JP | 2004-018716 A | 1/2004 | |
| JP | 2004-059857 A | 2/2004 | |
| JP | 2004-066817 A | 3/2004 | |
| JP | 2004-099796 A | 4/2004 | |
| JP | 2004-161852 A | 6/2004 | |
| JP | 2004-174971 A | 6/2004 | |
| JP | 2004-195797 A | 7/2004 | |
| JP | 2004-197055 A | 7/2004 | |
| JP | 2004-216654 A | 8/2004 | |
| JP | 2004-250659 A | 9/2004 | |
| JP | 2004-263139 A | 9/2004 | |
| JP | 2004-264435 A | 9/2004 | |
| JP | 2004-535506 A | 11/2004 | |
| JP | 2004-535508 A | 11/2004 | |
| JP | 2004-359960 A | 12/2004 | |
| JP | 2005-007577 A | 1/2005 | |
| JP | 2005-008690 A | 1/2005 | |
| JP | 2005-015813 A | 1/2005 | |
| JP | 2005-023284 A | 1/2005 | |
| JP | 2005-023299 A | 1/2005 | |
| JP | 2005-036079 A | 2/2005 | |
| JP | 2005-060411 A | 3/2005 | |
| JP | 2005-060419 A | 3/2005 | |
| JP | 2005-068250 A | 3/2005 | |
| JP | 2005-068251 A | 3/2005 | |
| JP | 2005-068252 A | 3/2005 | |
| JP | 2005-068439 A | 3/2005 | |
| JP | 2005-096254 A | 4/2005 | |
| JP | 2005-161583 A | 6/2005 | |
| JP | 2005-187659 A | 7/2005 | |
| JP | 2005-220352 A | 8/2005 | |
| JP | 2005-290362 A | 10/2005 | |
| JP | 2005-298757 A | 10/2005 | |
| JP | 2005-314655 A | 11/2005 | |
| JP | 2005-350551 A | 12/2005 | |
| JP | 2005-536375 A | 12/2005 | |
| JP | 2006-070255 A | 3/2006 | |
| JP | 2006-117795 A | 5/2006 | |
| JP | 2006-117931 A | 5/2006 | |
| JP | 2006-123529 A | 5/2006 | |
| JP | 2006-123542 A | 5/2006 | |
| JP | 2006-176734 A | 7/2006 | |
| JP | 2006-241194 A | 9/2006 | |
| JP | 2006-257302 A | 9/2006 | |
| JP | 2006-257303 A | 9/2006 | |

| | | |
|---|---|---|
| JP | 2006-265292 A | 10/2006 |
| JP | 2006-265524 A | 10/2006 |
| JP | 2006-272933 A | 10/2006 |
| JP | 2006-274029 A | 10/2006 |
| JP | 2006-281538 A | 10/2006 |
| JP | 2006-281568 A | 10/2006 |
| JP | 2006-281570 A | 10/2006 |
| JP | 2006-282822 A | 10/2006 |
| JP | 2006-282823 A | 10/2006 |
| JP | 2006-283017 A | 10/2006 |
| JP | 2006-523762 A | 10/2006 |
| JP | 2006-312711 A | 11/2006 |
| JP | 2007-023161 A | 2/2007 |
| JP | 2007-045989 A | 2/2007 |
| JP | 2007-046034 A | 2/2007 |
| JP | 2007-055084 A | 3/2007 |
| JP | 2007-100053 A | 4/2007 |
| JP | 2007-100054 A | 4/2007 |
| JP | 2007-112970 A | 5/2007 |
| JP | 2007-131741 A | 5/2007 |
| JP | 2007-138084 A | 6/2007 |
| JP | 2007-154087 A | 6/2007 |
| JP | 2007-169306 A | 7/2007 |
| JP | 2007-169307 A | 7/2007 |
| JP | 2007-169308 A | 7/2007 |
| JP | 2007-169451 A | 7/2007 |
| JP | 2007-191613 A | 8/2007 |
| JP | 2007-211036 A | 8/2007 |
| JP | 2007-254735 A | 10/2007 |
| JP | 2007-262272 A | 10/2007 |
| JP | 2007-269017 A | 10/2007 |
| JP | 2007-270085 A | 10/2007 |
| JP | 2007-297586 A | 11/2007 |
| JP | 2008-075067 A | 4/2008 |
| JP | 2008-138045 A | 6/2008 |
| JP | 2008-155523 A | 7/2008 |
| JP | 2008-155524 A | 7/2008 |
| JP | 2008-174712 A | 7/2008 |
| JP | 2009-113494 A | 5/2009 |
| JP | 2009-114454 A | 5/2009 |
| JP | 2009-242441 A | 10/2009 |
| JP | 2010-006062 A | 1/2010 |
| JP | 2010-090270 A | 4/2010 |
| JP | 2010-090271 A | 4/2010 |
| JP | 2010-094809 A | 4/2010 |
| JP | 2010-094852 A | 4/2010 |
| WO | 93/21235 A1 | 10/1993 |
| WO | 99/05230 A1 | 2/1999 |
| WO | 00/52530 | 9/2000 |
| WO | 01/08895 A1 | 2/2001 |
| WO | 02/38687 A1 | 5/2002 |
| WO | 02/055619 A1 | 7/2002 |
| WO | 02/076764 A2 | 10/2002 |
| WO | 2004/018197 A1 | 3/2004 |
| WO | 2004/031308 | 4/2004 |
| WO | 2004/052947 A1 | 6/2004 |
| WO | 2004/094534 A1 | 11/2004 |
| WO | 2004/104051 A1 | 12/2004 |
| WO | 2005/047405 A1 | 5/2005 |
| WO | 20051061566 A1 | 7/2005 |
| WO | 2005/089957 A1 | 9/2005 |
| WO | 2005/095006 A1 | 10/2005 |
| WO | 2006/041004 A1 | 4/2006 |
| WO | 2006/085992 A2 | 8/2006 |
| WO | 2006/087930 A1 | 8/2006 |
| WO | 2006/098676 A1 | 9/2006 |
| WO | 2006-101054 A1 | 9/2006 |
| WO | 20061/112031 A1 | 10/2006 |
| WO | 2007/026355 A2 | 3/2007 |
| WO | 2007/026366 A1 | 3/2007 |
| WO | 20071060264 A2 | 5/2007 |

OTHER PUBLICATIONS

Patent Abstract of JP 2003-055563.
Monroe, B., et al., "Photoinitiators for Free-Radical-Initiated Photoimaging Systems", American Chemical Society, Chemical Rev. 93, pp. 435-448, 1993.
Saeva, F. D., et al., Topics in Current Chemistry 156, Photoinduced Electron Transfer (PET) Bond Cleavage Reactions, 1990.
Final Office Action, U.S. Appl. No. 12/228,193, dated Oct. 14, 2011.
Maslak, P., et al., Topics in Current Chemistry, 168, Fragmentations by Photoinduced Electron Transfer Fundamentals and Practical Aspects, 1993.
Chatterjee, S., et al., "Photochemistry of Carbocyanine Alkyltriphenylborate Salts: Intra-Ion-Pair Electron Transfer and the Chemistry of Boranyl Radicals", J. Am. Chem. Soc., 112, pp. 6329-6338, 1990.
Eaton, D., et al., "One-electron oxidation of benzyltrialkylstannanes. 1. Cation radical fragmentation by dual modes", J. Am. Chem. Soc., 1980, 102 (9), pp. 3278-3280 Publication Date: Apr. 1980.
Fouassier, J.P., "Photoinitiated Polymerisation—Theory and Applications", Rapra Review Report, vol. 9, No. 4, 1998.
Final Office Action, U.S. Appl. No. 12/894,423, dated May 29, 2012.
Office Action, U.S. Appl. No. 12/894,423, dated Nov. 10, 2011.
Office Action, JP2007-304874 dated May 25, 2011, English Translation.
Office Action, U.S. Appl. No. 12/394,336, dated Apr. 26, 2012.
Ciba® IRGACURE® 369 Photoinitiator, Ciba Specialty Chemicals Coating Effects Segment, Edition 4.9.2001.
CIBA®, ®Ciba Secialty Chemicals, "Ciba® IRGASTAB® UV 22", Coating Effects, 2006.
EP Search Report for Application No. 11152226.4, dated May 11, 2005.
The Japanese Research Association for Organic Materials for Imaging, Bunshin Publishing co., pp. 187-192, 1993.
Notice of Allowance, U.S. Appl. No. 12/228,224 dated Oct. 20, 2011.
Office Action, U.S. Appl. No. 12/228,224, dated Jun. 2, 2011.
Supplemental Notice of Allowance, U.S. Appl. No. 12/228,224, dated Jun. 28, 2012.
Step, E.N., et al., "Mechanism of Polymer Stabilization by Hindered-Amine Light Stabilizers (HALS). Model Investigations of the Interaction of Peroxy Radicals with HALS Amines and Amino Ethers", Macromolecules, American Chemical Society, 27, pp. 2529-2539, 1994.
LAROMER® UA 9029 V, Technical Information Sheet, BASF, Dec. 2003.
Ciba® IRGACURE 127 Photoinitiator, Technical Data Sheet from Ciba Specialty Chemicals, 2004.
Ciba® IRGACURE 819 Photoinitiator, Technical Data Sheet from Ciba Specialty Chemicals, 2004.
Ciba® DAROCUR EDB, Photoinitiator, Ciba Specialty Chemicals Coating Effects, product technical disclosure, Feb. 20, 2003.
Kim, Y., "Highly Branched Aromatic Polymers Prepared by Single Step Syntheses", Macromol. Symp. pp. 21-33, 1994.
Hawker, C., et al., "Hyperbranched Poly(ethylene glycol)s: A New Class of Ion-Conducting Materials", Macromolecules, vol. 29, pp. 3831-3838, 1996.
European Search Report, EP07024545.1 dated Apr. 21, 2008.
Office Action, U.S. Appl. No. 13/240,667 dated Dec. 12, 2011.
EP Search Report, Application No. 11177753.8, dated Nov. 2, 2011.
Final Office Action, U.S. Appl. No. 12/074,308 dated Jun. 8, 2012.
Office Action, CN Application No. 200910004654.0, dated Nov. 30, 2010, with English Translation.
Office Action, JP Application No. 2007-316368, dated Mar. 9, 2011, with English Translation.
Office Action, U.S. Appl. No. 12/074,308, dated Dec. 21, 2011.
Office Action, U.S. Appl. No. 13/197,174, dated Jan. 6, 2012.
Dispersion definition from Hawley's Condensed Chemical Dictionary.
Dispersion (chemistry) Wikipedia Definition, Wikipedia the free encyclopedia, Oct. 25, 2010.
Shiraj, M., et al, "Photoacid and Photobase Generators: Chemistry and Applications to Polymeric Materials", Prog. Polm. Sci., vol. 21, No. 1, 1996.
Office Action, U.S. Appl. No. 12/228,193 dated Jun. 2, 2011.
Office Action, U.S. Appl. No. 12/228,193, dated Mar. 8, 2012.
Davidson, R.S., "The chemistry of photoinitiators—some recent developments", J. Photochem: Photobiol., A: Chem, 73. pp. 81-96, 1993.
Fouassier, J.P., et al., Radiation Curing in Polymer Science and Technology, vol. 1, fundamentals and methods, pp. 77-117, 1993.

EP Search Report for Application No. 08016440.3, dated Dec. 29, 2008.
Search Report for PCT/JP20081064126 dated Sep. 16, 2008.
Hawker, C., et al., "Preparation of Polymers with Controlled Molecular Architecture. A New Convergent Approach to Dendritic Macromolecules", Journal of American Chemistry Society, 1990, 112, pp. 7638-7647.

* cited by examiner

INK COMPOSITION

TECHNICAL FIELD

The present invention relates to an ink composition. More particularly, the invention relates to an ultraviolet curing type ink composition which is curable by ultraviolet light, and excellent in ejection stability and wettability (prevention of repellency) of an ink landed on a recording medium.

BACKGROUND ART

An ink jet recording method is a printing method in which droplets of an ink composition are allowed to fly and deposited on a recording medium such as paper to perform printing. This ink jet recording method is characterized by that images having high resolution and high quality can be printed at high speed. The ink composition used in the ink jet recording method is generally one mainly comprising an aqueous solvent and containing a coloring component and a wetting agent such as glycerin for the purpose of preventing clogging.

Further, when printing is performed on a recording medium such as paper or cloth that is hard for the aqueous ink composition to penetrate thereinto, or a plate or a film made of a material such as metal or plastics into which the aqueous ink composition does not penetrate, for example, a resin such as a phenol, melamine, vinyl chloride, acrylic or polycarbonate resin, the ink composition is required to contain a component which can allow the coloring material to be stably fixed to the recording medium. In particular, when printing is performed on a printed-circuit board or the like, the ink composition is required to have quick drying properties and solvent resistance.

To such a demand, there has hitherto been proposed an ink composition comprising a component polymerizable by ultraviolet irradiation (for example, see patent document 1). Further, an ultraviolet curing type ink composition comprising a coloring material, an ultraviolet curing agent, a photopolymerization initiator and the like has been proposed (for example, see patent document 2). According to these ink compositions and ink jet recording methods, it is disclosed that blurring of the ink composition on the recording medium can be prevented to improve image quality.

In the ink jet recording method using the ink composition comprising the component polymerizable by ultraviolet irradiation as described above, an ultraviolet lay is irradiated after the ink composition has been deposited on the recording medium. Thereupon, the photopolymerization initiator in the ink composition forms radicals, thereby initiating polymerization of an oligomer and a monomer to cause curing. Accordingly, the coloring material in the ink composition is firmly fixed onto the recording medium. It is considered that printing which is high in film strength, solvent resistance and color density and decreased in blurring and unevenness can be realized by this firm fixing.

However, the ultraviolet curing type ink composition comprising the coloring material, the ultraviolet curing agent, the photopolymerization initiator and the like as described above has insufficient wettability to a surface of a nonabsorbable material such as glass or metal, so that repellency occurs on a print surface and at an interface at the time when recoating has been performed, resulting in failure to obtain a clear color image.

There is disclosed an ink composition in which a polyether-modified silicone oil is allowed to be contained as a surface tension regulator in an ultraviolet curing type ink composition for the purpose of improving wettability to a surface of a nonabsorbable material (for example, see patent document 3). However, the polyether-modified silicone oil improves wettability to only a surface of a specific nonabsorbable material, so that it is unsatisfactory.

Patent Document 1: JP-A-3-216379
Patent Document 2: U.S. Pat. No. 5,623,001
Patent Document 1: JP-A-2003-147233

DISCLOSURE OF THE INVENTION

Problems to be Solved by the Invention

It is therefore an object of the invention to solve the above-mentioned problems and to provide an ultraviolet curing type ink composition excellent in wettability to surfaces of all nonabsorbable materials.

Means for Solving the Problems

The present inventors have conducted intensive studies, and as a result, have found that the use of a polyester-modified polydimethylsiloxane can improve wettability to surfaces of all nonabsorbable materials and can prevent repellency of an ink, thus completing the invention.

That is to say, the invention is achieved by the following constitution:

(1) An ink composition comprising at least a polymerizable compound, a photopolymerization initiator, a surfactant and a coloring material, which contains a polyester-modified polydimethylsiloxane as the surfactant in an amount of 0.01% to 1%.

(2) The ink composition of (1), which contains no solvent.

(3) The ink composition of (1) or (2), which contains at least allyl glycol and/or an N-vinyl compound as the polymerizable compound.

(4) The ink composition of (3), which contains the allyl glycol and/or N-vinyl compound in an amount of 20% to 80%.

(5) The ink composition of (3) or (4), wherein the above-mentioned N-vinyl compound is N-vinylformamide.

The ultraviolet curing type ink of the invention contains the polyester-modified polydimethylsiloxane as the surfactant in an amount of 0.01% to 1%, thereby being able to improve wettability to surfaces of all nonabsorbable materials to prevent repellency of the ink.

BEST MODE FOR CARRYING OUT THE INVENTION

The polyester-modified polydimethylsiloxanes used as the surfactant in the invention include one in which polyester groups are introduced into part of methyl groups of a dimethylsiloxane. Examples thereof include one known by the trade name BYK-UV3570 (manufactured by BYK-Chemie Japan K.K.) and the like. Modified polydimethylsiloxanes also include modified polydimethylsiloxanes in which various organic groups are introduced, such as polyether—modified polydimethylsiloxanes (which include, for example, those known by the trade names KF-351 and 945 (manufactured by Shin-Etsu Chemical Co., Ltd.), TSF 4440 and 4460 (manufactured by GE Toshiba Silicone Co., Ltd.), BYK-307, 333 and 348 (manufactured by BYK-Chemie Japan K.K.) and the like), amino-modified polydimethylsiloxanes (which include, for example, those known by the trade names KF-8012 and 865 (manufactured by Shin-Etsu Chemical Co., Ltd.), TSF 4700 and 4701 (manufactured by GE Toshiba Silicone Co., Ltd.) and the like), carbinol-modified polydimethylsiloxanes (which include, for example, those known by the trade names KF-6001 and 6002 (manufactured by Shin-Etsu Chemical Co., Ltd.), XF 42-B0970 (manufactured by GE Toshiba Silicone Co., Ltd.) and the like) and alkyl-modified polydimethylsiloxanes (which include, for example, those known by the trade names KF-412, 413 and 414 (manufactured by Shin-Etsu Chemical Co., Ltd.), TSF 4421 (manufactured by GE Toshiba Silicone Co., Ltd.) and the like), as well as the polyester-modified polydimethylsiloxanes. However, in order to improve wettability of an ink composition on surfaces of all nonabsorbable materials and also improve prevention of repellency of an ink, it is necessary to use the polyester-modified polydimethylsiloxanes.

Further, the polyester-modified polydimethylsiloxane used as the surfactant in the invention is preferably used at a compounding ratio to the ink composition ranging from 0.01% to 1% in order to improve wettability to the surface of the nonabsorbable material.

The coloring material contained in the ultraviolet curing type ink used in the invention may be either a dye or a pigment. However, the pigment is more advantageous in terms of durability of printed matter.

As the dyes used in the invention, there can be used various dyes which are generally used for ink jet recording, such as a direct dye, an acid dye, a food dye, a basic dye, a reactive dye, a disperse dye, a vat dye, a soluble vat dye and a reactive disperse dye.

As the pigments used in the invention, inorganic pigments and organic pigments can be used without particular limitation.

As the inorganic pigments, there can be used carbon blacks produced by known processes such as a contact process, a furnace process and a thermal process, as well as titanium oxide and iron oxide.

Further, as the organic pigments, there can be used azo pigments (including an azo lake, an insoluble azo pigment, a condensed azo pigment, a chelate azo pigment and the like), polycyclic pigments (for example, a phthalocyanine pigment, a perylene pigment, a perynone pigment, an anthraquinone pigment, a quinacridone pigment, a dioxazine pigment, a thioindigo pigment, an isoindolinone pigment, a quinophthalone pigment and the like), dye chelates (for example, a basic dye type chelate, acid dye type chelate and the like), nitro pigments, nitroso pigments, aniline black and the like.

Specific examples of the pigments as carbon blacks include No. 2300, No. 900, MCF88, No. 33, No. 40, No. 45, No. 52, MA7, MA8, MA100, No2200B and the like manufactured by Mitsubishi Chemical Corporation, Raven 5750, Raven 5250, Raven 5000, Raven 3500, Raven 1255, Raven 700 and the like manufactured by Columbia Co., Regal 400R, Regal 330R, Regal 660R, Mogul L, Mogul 700, Monarch 800, Monarch 880, Monarch 900, Monarch 1000, Monarch 1100, Monarch 1300, Monarch 1400 and the like manufactured by Cabot Co., Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 and the like manufactured by Degussa Co., C.I. Pigment Black 7 and the like.

The pigments used in yellow inks include C.I. Pigment Yellow 1, 2, 3, 12, 13, 14, 16, 17, 73, 74, 75, 83, 93, 95, 97, 98, 109, 110, 114, 128, 129, 138, 150, 151, 154, 155, 180 185 and the like.

Further, the pigments used in magenta inks include C.I. pigment red 5, 7, 12, 48(Ca), 48(Mn), 57(Ca), 57:1, 112, 122, 123, 168, 184, 202 and 209, C.I. Pigment Violet 19 and the like.

Furthermore, the pigments used in cyan inks include C.I. pigment blue 1, 2, 3, 15:3, 15:4, 60, 16 and 22.

According to a preferred embodiment of the ultraviolet curing type ink of the invention, the average particle size of the pigment ranges preferably from 10 to 200 nm, and more preferably from about 50 to 150 nm.

Further, The amount of the coloring material added in the ultraviolet curing type ink composition preferably ranges from about 0.1 to 25% by weight, and more preferably from about 0.5 to 15% by weight.

These pigments are preferably added to the ink composition as pigment dispersions obtained by dispersing them in aqueous media or polymerizable compounds with dispersing agents. As the preferred dispersing agents, there can be used dispersing agents which are conventionally used for preparing pigment dispersions, for example, polymeric dispersing agents.

The photopolymerization initiator contained in the ultraviolet curing type ink used in the invention is, for example, one which absorbs ultraviolet light in a region of about 200 nm to 450 nm or visible light to form radicals or ions, thereby initiating polymerization of the polymerizable compound.

Typical examples of the photopolymerization initiators used in the invention include benzoin methyl ether, benzoin ethyl ether, isopropyl benzoin ether, isobutyl benzoin ether, 1-phenyl-1,2-propanedione-2-(o-ethoxycarbonyl)oxime, benzyl, diethoxyacetophenone, benzophenone, chlorothioxantone, 2-chlorothioxantone, isopropylthioxantone, 2-methylthioxantone, polychlorinated polyphenyl, hexachlorobenzene and the like, and preferred are isobutyl benzoin ether and 1-phenyl-1,2-propanedione-2-(o-ethoxycarbonyl)oxime.

Further, there can also be used photopolymerization initiators available under the trade names of Vicure 10 and 30 (manufactured by Stauffer Chemical), Irgacure 184, 651, 2959, 907, 369, 1700, 1800, 1850, 819, 127, 379, 754, 500, 1300, 1870, 784, 250 and OXE01, and Darocur 1173, 4265 and TPO (manufactured by Ciba Specialty Chemicals), Quantacure CTX and ITX (manufactured by Aceto Chemical) and Lucirin TPO (manufactured by BASF).

It is preferred that at least allyl glycol and/or an N-vinyl compound are contained as the polymerizable compound contained in the ultraviolet curing type ink used in the invention.

Further, in the ultraviolet curing type ink composition, the allyl glycol and/or N-vinyl compound are preferably contained in an amount of 20% to 80%.

The N-vinyl compounds include N-vinylformamide, N-vinylcarbazole, N-vinylacetamide, N-vinylpyrrolidone, N-vinylcaprolactam, derivatives thereof and the like.

Further, the polymerizable compound contained in the ultraviolet curing type ink used in the invention may contain a different polymerizable compound other than allyl glycol and/or the N-vinyl compound, as the polymerizable compound.

The different polymerizable compound is not particularly limited, as long as it is polymerized by radicals or ions generated from the photopolymerization initiator. Such a polymerizable compound means a molecule which can form a constituent unit of a basic structure of a polymer. Such a polymerizable compound is also called a photopolymerizable monomer, and includes a monofunctional acrylate and methacrylate and a multifunctional acrylate and methacrylate.

Typical ones of such polymerizable compounds include 1,3-butylene glycol diacrylate, 1,5-pentanediol diacrylate, 3-methyl-1,5-pentanediol diacrylate, 1,8-octanediol diacrylate, 1,9-nonanediol diacrylate, tricyclodecane-dimethanol diacrylate, polyethylene glycol diacrylate, propylene glycol diacrylate, dipropylene glycol diacrylate, polypropylene glycol diacrylate, ethylene glycol diacrylate, diethylene glycol diacrylate, neopentyl glycol diacrylate, 1,4-butanediol diacrylate, 1,6-hexanediol diacrylate, hydroxypiopelinic acid ester neopentyl glycol diacrylate, trimethylolpropane triacrylate, pentaerythritol triacrylate, dipentaerythritol hexaacrylate, 2-hydroxyethyl acrylate, 2-hydroxypropyl acrylate, 4-hydroxybutyl acrylate, isobutyl acrylate, t-butyl acrylate, isooctyl acrylate, lauryl acrylate, stearyl acrylate, cyclohexyl acrylate, methoxytriethylene acrylate, ethylcarbitol acrylate, 2-phenoxyethyl acrylate, dipentaerythritol polyacrylate, tripropylene glycol diacrylate, glycerin EO adduct triacrylate, isobonyl acrylate, 2-methoxyethyl acrylate, 3-methoxybutyl acrylate, 2-ethoxyethyl acrylate and the like.

A polymerization accelerator contained in the ultraviolet curing type ink used in the invention is not particularly limited. In particular, however, an aminobenzoate derivative is preferred in terms of the problem of odor and more reliable curing of the ultraviolet curing type ink composition. This is because the aminobenzoate derivative reduces polymerization inhibition caused by oxygen.

Typical ones of such aminobenzoate derivatives include ethyl 4-dimethylaminobenzoate, 2-ethylhexyl 4-dimethylaminobenzoate and the like. These are available under the trade names of Darocur EDB and EHA (manufactured by Ciba Specialty Chemicals) and the like.

The ultraviolet curing type ink used in the invention may contain an aqueous solvent. Further, as an arbitrary component, there may be added a resin emulsion, an inorganic oxide colloid, a wetting agent, a pH adjuster, a preservative, a mildewproofing agent or the like.

Furthermore, it is more preferred that the ultraviolet curing type ink used in the invention contains no organic solvent and is an ultraviolet curing type ink of a non-solvent type.

The ultraviolet curing type ink composition used in the invention is deposited on a substrate, a recording medium or the like by coating, ejection by an ink jet recording method, and the like, and then, irradiated with ultraviolet light.

The ultraviolet dose varies depending on the amount of the ultraviolet curing type ink composition deposited on a substrate, a recording medium or the like and the thickness thereof, and can not be exactly specified. Preferred conditions should be appropriately selected. For example, however, it ranges from 10 mJ/cm$^2$ to 10,000 mJ/cm$^2$, and preferably ranges from 50 mJ/cm$^2$ to 6,000 mJ/cm$^2$. When the ultraviolet dose is within such a range, the curing reaction can be sufficiently performed.

Further, as the ultraviolet light to be irradiated, it is preferred in terms of safety and environment that ultraviolet light in a long wavelength region of 350 nm or more which generates no ozone is used. Furthermore, it is preferred that the ultraviolet light to be irradiated is not one having a continuous spectrum, but one having a narrow light emission peak width. The wavelength region of this light emission peak is preferably within the range of 350 to 420 nm.

Although means for ultraviolet irradiation are not particularly limited, ultraviolet light emitting semiconductor elements such as ultraviolet LEDs and ultraviolet light emitting semiconductor lasers are preferred in terms of energy consumption, miniaturization and the life of lamps. When the ultraviolet LEDs are used, it is preferred that, for example, an LED having a light emitting peak wavelength of 365 nm, an LED having a light emitting peak wavelength of 380 nm and an LED having a light emitting peak wavelength of 395 nm are combined.

Other means for ultraviolet irradiation include lamps such as a metal halide lamp, a xenon lamp, a carbon arc lamp, a chemical lamp, a low-pressure mercury lamp and a high-pressure mercury lamp. For example, commercially available lamps such as H Lamp, D Lamp and V Lamp manufactured by Fusion System can also be used.

Further, in a recording method using the ultraviolet curing type ink composition of the invention, heating may be performed before, concurrently with or after ultraviolet light irradiation. Heating includes a method of heating by bringing a heat source into contact with the recording medium, a method of heating without contact with the recording medium, for example, by irradiating an infrared ray or a microwave (an electromagnetic wave having the maximum wavelength at about 2,450 MHz) or by blowing hot air, and the like.

EXAMPLES

The invention will be illustrated in greater detail with reference to the following Examples, but the invention should not be construed as being limited thereto.

Ink compositions having respective compositions shown in Tables 1 to 4 were each prepared.

TABLE 1

| | Black | | | | | |
|---|---|---|---|---|---|---|
| | Example 1 | Example 2 | Comparative Example 1 | Comparative Example 2 | Comparative Example 3 | Comparative Example 4 |
| Allyl Glycol | 55.2 | | | | | |
| N-Vinylformamide | | 55.2 | 55.2 | 55.2 | 55.2 | 55.3 |
| Tripropylene Glycol Diacrylate | 20 | 20 | 20 | 20 | 20 | 20 |
| EO Adduct Trimethylolpropane Triacrylate | 15 | 15 | 15 | 15 | 15 | 15 |
| Irgacure 1800 | 5 | 5 | 5 | 5 | 5 | 5 |
| Darocur EHA | 1 | 1 | 1 | 1 | 1 | 1 |
| BYK-UV3570 | 0.1 | 0.1 | | | | |
| BYK-307 | | | 0.1 | | | |
| KF-945 | | | | 0.1 | | |
| KF-96L | | | | | 0.1 | |
| Pigment Black-7 | 3 | 3 | 3 | 3 | 3 | 3 |
| Dispersing Agent (Polyoxyalkylene-polyalkylenepolyamine) | 0.7 | 0.7 | 0.7 | 0.7 | 0.7 | 0.7 |

TABLE 2

| | | | Cyan | | | |
|---|---|---|---|---|---|---|
| | Example 3 | Example 4 | Comparative Example 5 | Comparative Example 6 | Comparative Example 7 | Comparative Example 8 |
| Allyl Glycol | 55.2 | | | | | |
| N-Vinylformamide | | 55.2 | 55.2 | 55.2 | 55.2 | 55.3 |
| Tripropylene Glycol Diacrylate | 20 | 20 | 20 | 20 | 20 | 20 |
| EO Adduct Trimethylolpropane Triacrylate | 15 | 15 | 15 | 15 | 15 | 15 |
| Irgacure 1800 | 5 | 5 | 5 | 5 | 5 | 5 |
| Darocur EHA | 1 | 1 | 1 | 1 | 1 | 1 |
| BYK-UV3570 | 0.1 | 0.1 | | | | |
| BYK-307 | | | 0.1 | | | |
| KF-945 | | | | 0.1 | | |
| KF-96L | | | | | 0.1 | |
| Pigment Blue-15:3 | 3 | 3 | 3 | 3 | 3 | 3 |
| Dispersing Agent (Polyoxyalkylene-polyalkylenepolyamine) | 0.7 | 0.7 | 0.7 | 0.7 | 0.7 | 0.7 |

TABLE 3

| | | | Magenta | | | |
|---|---|---|---|---|---|---|
| | Example 5 | Example 6 | Comparative Example 9 | Comparative Example 10 | Comparative Example 11 | Comparative Example 12 |
| Allyl Glycol | 55 | | | | | |
| N-Vinylformamide | | 55 | 55 | 55 | 55 | 55.1 |
| Tripropylene Glycol Diacrylate | 20 | 20 | 20 | 20 | 20 | 20 |
| EO Adduct Trimethylolpropane Triacrylate | 15 | 15 | 15 | 15 | 15 | 15 |
| Irgacure 1800 | 5 | 5 | 5 | 5 | 5 | 5 |
| Darocur EHA | 1 | 1 | 1 | 1 | 1 | 1 |
| BYK-UV3570 | 0.1 | 0.1 | | | | |
| BYK-307 | | | 0.1 | | | |
| KF-945 | | | | 0.1 | | |
| KF-96L | | | | | 0.1 | |
| Pigment Violet-19 | 3 | 3 | 3 | 3 | 3 | 3 |
| Dispersing Agent (Polyoxyalkylene-polyalkylenepolyamine | 0.9 | 0.9 | 0.9 | 0.9 | 0.9 | 0.9 |

TABLE 4

| | | | Yellow | | | |
|---|---|---|---|---|---|---|
| | Example 7 | Example 8 | Comparative Example 13 | Comparative Example 14 | Comparative Example 15 | Comparative Example 16 |
| Allyl Glycol | 55.3 | | | | | |
| N-Vinylformamide | | 55.3 | 55.3 | 55.3 | 55.3 | 55.4 |
| Tripropylene Glycol Diacrylate | 20 | 20 | 20 | 20 | 20 | 20 |
| EO Adduct Trimethylolpropane Triacrylate | 15 | 15 | 15 | 15 | 15 | 15 |
| Irgacure 1800 | 5 | 5 | 5 | 5 | 5 | 5 |
| Darocur EHA | 1 | 1 | 1 | 1 | 1 | 1 |
| BYK-UV3570 | 0.1 | 0.1 | | | | |
| BYK-307 | | | 0.1 | | | |
| KF-945 | | | | 0.1 | | |
| KF-96L | | | | | 0.1 | |
| Pigment Yellow-155 | 3 | 3 | 3 | 3 | 3 | 3 |
| Dispersing Agent (Polyoxyalkylene-polyalkylenepolyamine) | 0.6 | 0.6 | 0.6 | 0.6 | 0.6 | 0.6 |

Allyl glycol (manufactured by Nippon Nyukazai Co., Ltd.)

N-Vinylformamide (manufactured by Arakawa Chemical Industries Ltd., trade name: Beamset 770)

Tripropylene glycol diacrylate (manufactured by Toagosei Co., Ltd, trade name: Aronix M-220)

EO adduct trimethylolpropane triacrylate (manufactured by Dai-Ichi Kogyo Seiyaku Co., Ltd., trade name: New Frontier TMP-3P)

Irgacure 1800 (manufactured by Ciba Specialty Chemicals)

Darocur EHA (manufactured by Ciba Specialty Chemicals)

BYK-UV3570 (polyester-modified polydimethylsiloxane, manufactured by BYK-Chemie Japan K.K.)

BYK-307 (polyether-modified polydimethylsiloxane, manufactured by BYK-Chemie Japan K.K.)

KF-945 (polyether-modified polydimethylsiloxane, manufactured by Shin-Etsu Chemical Co., Ltd.)

KF-96L (polydimethylsiloxane, manufactured by Shin-Etsu Chemical Co., Ltd.)

Curing Test

The above-mentioned ultraviolet curing type ink composition was dropped onto a glass substrate, and treated under curing conditions of an ultraviolet wavelength of 365 nm, an irradiation intensity of 17 mW/cm2, an irradiation time of 6 seconds and an integrated light volume of 102 mJ/cm2. Then, the following visual evaluation of a surface state was conducted.

The results are shown in Table 5.

Evaluation Indexes

A: Cured in a smooth surface state.

B: A surface state was smooth, but wrinkles slightly occurred at an interface with the glass.

C: Wrinkles slightly occurred by curing contraction.

D: Wrinkles occurred all over a surface by curing contraction.

Print Test

Utilizing an ink jet printer, PM-G900, manufactured by Seiko Epson Corporation, solid pattern printing was performed at ordinary temperature and ordinary pressure using the above-mentioned ink compositions and a PVC sheet (manufactured by Lintec Corporation, Viewcal 900), an OHP film (manufactured by Fuji Xerox Co., Ltd., XEROX FILM <unframed>) and a PC sheet (manufactured by Teijin Chemicals Ltd. Printing and curing treatment were performed at the same time by means of an ultraviolet irradiation equipment installed at a delivery port under such curing conditions as to give an integrated light amount of 90 mJ/cm2. The following visual evaluation of a surface state was conducted.

The results are shown in Table 6.

Evaluation Indexes

A: There is no repellency, and edge portions are sharp. The effect is sufficient.

B: There is no repellency, but edge portions lack in sharpness.

C: Somewhat repelled. The effect is insufficient.

D: Almost repelled. There is no effect.

TABLE 5

Curing Test

| | Example 1 | Example 2 | Comparative Example 1 | Comparative Example 2 | Comparative Example 3 | Comparative Example 4 |
|---|---|---|---|---|---|---|
| Surface State | A | A | B | C | C | D |

| | Example 3 | Example 4 | Comparative Example 5 | Comparative Example 6 | Comparative Example 7 | Comparative Example 8 |
|---|---|---|---|---|---|---|
| Surface State | A | A | B | C | C | D |

| | Example 5 | Example 6 | Comparative Example 9 | Comparative Example 10 | Comparative Example 11 | Comparative Example 12 |
|---|---|---|---|---|---|---|
| Surface State | A | A | B | B | C | C |

| | Example 7 | Example 8 | Comparative Example 13 | Comparative Example 14 | Comparative Example 15 | Comparative Example 16 |
|---|---|---|---|---|---|---|
| Surface State | A | A | B | B | C | D |

TABLE 6

Print Test

|  | Example 1 | Example 2 | Comparative Example 1 | Comparative Example 2 | Comparative Example 3 | Comparative Example 4 |
|---|---|---|---|---|---|---|
| PVC Sheet | A | A | B | C | C | D |
| OHP Film | A | A | C | D | D | D |
| PC Sheet | A | A | C | C | D | D |

|  | Example 3 | Example 4 | Comparative Example 5 | Comparative Example 6 | Comparative Example 7 | Comparative Example 8 |
|---|---|---|---|---|---|---|
| PVC Sheet | A | A | B | B | C | D |
| OHP Film | A | A | C | C | D | D |
| PC Sheet | A | A | C | C | D | D |

|  | Example 5 | Example 6 | Comparative Example 9 | Comparative Example 10 | Comparative Example 11 | Comparative Example 12 |
|---|---|---|---|---|---|---|
| PVC Sheet | A | A | B | B | B | C |
| OHP Film | A | A | B | C | C | D |
| PC Sheet | A | A | C | C | C | D |

|  | Example 7 | Example 8 | Comparative Example 13 | Comparative Example 14 | Comparative Example 15 | Comparative Example 16 |
|---|---|---|---|---|---|---|
| PVC Sheet | A | A | B | B | C | D |
| OHP Film | A | A | C | C | D | D |
| PC Sheet | A | A | C | C | D | D |

With respect to the ultraviolet curing type inks of Examples to which the polyester-modified polydimethylsiloxane was added, clear printed matter having no repellency was obtained, regardless of the recording medium.

The invention claimed is:

1. An ultraviolet curing inkjet ink composition comprising at least a polymerizable compound, a photopolymerization initiator, a surfactant and a coloring material, which contains a polyester-modified polydimethylsiloxane as the surfactant in an amount of 0.01% to 1%.

2. The ultraviolet curing inkjet ink composition according to claim 1, which contains no solvent.

3. The ultraviolet curing inkjet ink composition according to claim 1, which contains at least allyl glycol and/or an N-vinyl compound as the polymerizable compound.

4. The ultraviolet curing inkjet ink composition according to claim 3, which contains the allyl glycol and/or N-vinyl compound in an amount of 20% to 80%.

5. The ultraviolet curing inkjet ink composition according to claim 3, wherein the N-vinyl compound is N-vinylformamide.

6. The ultraviolet curing inkjet ink composition according to claim 2, which contains at least allyl glycol and/or an N-vinyl compound as the polymerizable compound.

7. The ultraviolet curing inkjet ink composition according to claim 4, wherein the N-vinyl compound is N-vinylformamide.

8. The ultraviolet curing inkjet ink composition according to claim 1, which is to be used in a recording method in which the ultraviolet curing inkjet ink composition is cured by irradiating an ultraviolet ray by an ultraviolet LED having a light emission peak within a wavelength region of 350 to 420 nm.

9. The ultraviolet curing inkjet ink composition according to claim 1, which is to be used in a recording method in which the ultraviolet curing inkjet ink composition is cured by irradiating an ultraviolet ray with an ultraviolet dose within a range of from 50 mJ/cm$^2$ to 6,000 mJ/cm$^2$.

10. The ultraviolet curing inkjet ink composition according to claim 1, wherein the photopolymerization initiator is a photopolymerization initiator which absorbs ultraviolet light in a region of 200 nm to 450 nm or visible light to form radicals or ions, thereby initiating polymerization of the polymerizable compound.

11. The ultraviolet curing inkjet ink composition according to claim 1, which is to be used on a surface of a nonabsorbable material.

12. The ultraviolet curing inkjet ink composition according to claim 1, wherein the coloring material is a pigment.

13. The ultraviolet curing inkjet ink composition according to claim 1, wherein the polymerizable compound includes at least one of a monofunctional acrylate, a monofunctional methacrylate, a multifunctional acrylate and a multifunctional methacrylate.

* * * * *

UNITED STATES PATENT AND TRADEMARK OFFICE
CERTIFICATE OF CORRECTION

PATENT NO.        : 8,530,538 B2                                              Page 1 of 1
APPLICATION NO.   : 11/887464
DATED             : September 10, 2013
INVENTOR(S)       : Nakano et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1507 days.

Signed and Sealed this
Fifteenth Day of September, 2015

Michelle K. Lee
*Director of the United States Patent and Trademark Office*